(12) United States Patent
Harres

(10) Patent No.: US 7,433,596 B2
(45) Date of Patent: Oct. 7, 2008

(54) BI-DIRECTIONAL, FULL-DUPLEX, ONE-WIRE COMMUNICATIONS LINK FOR USE IN FIBER OPTIC TRANSCEIVERS

(75) Inventor: Daniel N. Harres, Belleville, IL (US)

(73) Assignee: The Boeing Corporation, Chicago, IL (US)

( * ) Notice: Subject to any disclaimer, the term of this patent is extended or adjusted under 35 U.S.C. 154(b) by 193 days.

(21) Appl. No.: 11/317,766

(22) Filed: Dec. 23, 2005

(65) Prior Publication Data

US 2007/0147844 A1 Jun. 28, 2007

(51) Int. Cl.
*H04B 10/24* (2006.01)
*H04B 10/00* (2006.01)

(52) U.S. Cl. .......................... 398/41; 398/138; 398/139

(58) Field of Classification Search .................. 398/41, 398/42, 135, 138, 139
See application file for complete search history.

(56) References Cited

U.S. PATENT DOCUMENTS

| 5,317,441 | A | | 5/1994 | Sidman | |
|---|---|---|---|---|---|
| 5,436,887 | A | | 7/1995 | Eisenhuth | |
| 5,469,285 | A | * | 11/1995 | Gut | 398/41 |
| 7,123,806 | B2 | * | 10/2006 | Jahn et al. | 385/134 |
| 2002/0027689 | A1 | * | 3/2002 | Bartur et al. | 359/152 |
| 2005/0041917 | A1 | | 2/2005 | Harres | |
| 2005/0110979 | A1 | | 5/2005 | Harres | |
| 2005/0174435 | A1 | * | 8/2005 | Nakajima | 348/211.99 |

FOREIGN PATENT DOCUMENTS

EP 0748077 A 12/1996

OTHER PUBLICATIONS

East, et al., "Full Duplex Interface Circuit", IP.Com Journal, IP.Com Inc., West Henrielta, NY, US, Nov. 1, 1978, XP013060103, ISSN: 1533-0001.
Hashimoto T et al., "A bidirectional single fiber 1.25 Gb/s optical transceiver module with SFP package using PLC", 2003 Proceedings 53rd. Electronic Components and Technology Conference. (ECTC). New Orleans, LA. May 27-30, 2003, Proceedings of the Electronic Components and Technology Conference, New York, NY: IEEE, US, vol. Conf. 53, May 27, 2003, pp. 279-283, XP010647477, ISBN: 0-7803-7991-5.
Small Form-factor Pluggable (SFP) Transceiver MultiSource Agreement (MSA), Cooperation Agreement for Small Form-Factor Pluggable Transceivers, Sep. 14, 2000 (38 pages).
Small Form Factor Transceiver Multisource Agreement, Cooperation Agreement for Small Form Factor Transceivers, Jan. 6, 1998 (8 pages).

* cited by examiner

*Primary Examiner*—Dalzid Singh
(74) *Attorney, Agent, or Firm*—Wildman, Harrold, Allen & Dixon, LLP

(57) ABSTRACT

An apparatus is provided that is capable of achieving bidirectional, full-duplex communication with an optical transceiver. In some instances, the communication is achieved over a single electrical connection of the transceiver and via the use of a duplexing circuit on the transceiver and a complementary duplexing circuit on a distal circuit coupled to the transceiver via the single electrical connection. The techniques described may be used to modify existing optical transceivers to provide diagnostic or health information without interrupting normal transceiver operation.

39 Claims, 5 Drawing Sheets

BI-DIRECTIONAL, FULL-DUPLEX, ONE-WIRE COMMUNICATIONS LINK FOR USE IN FIBER OPTIC TRANSCEIVERS

This invention was made with Government support under N00019-04-C-0005 awarded by the United States Navy. The Government has rights in this invention.

FIELD OF THE INVENTION

The invention generally relates to optical transceivers and more particularly to methods and apparatuses for bidirectional communication using an optical transceiver.

BACKGROUND OF THE RELATED ART

Optical transceivers are the backbone of optical networks. Optical transceivers transmit and receive the application critical data in network implementations. Such transceivers are commonly placed in direct communication with one another via a fiber optic coupling so that data may be shared between transceivers and thus shared between different nodes and devices of the network.

To bring uniformity to optical transceiver configurations, a number of industry wide standards have been developed. One such standard is the Small Form Factor (SFF) Transceiver Multisource Agreement that has been developed to establish internationally compatible standards for systems including Asynchronous Transfer Mode (ATM), FDDI, Fibre Channel, Fast Ethernet, Gigabit Ethernet, and Synchronous Optical Networking (SONET)/Synchronous Digital Hierarchy (SDH) applications. The SFF standard sets packaging outlines, circuit board layout, and pin function definitions for compliant transceivers. Optical transceivers compliant with the SFF package protocol may be designed to have a ten pin input/output stage, for example, where every pin of the stage is dedicated to a particular purpose. While this uniformity brings obvious advantages, there are attendant disadvantages. In particular, the SFF packaging standard limits the physical dimensions of an optical transceiver, which limits designers from being able to add additional functionality to a device. The SFF packaging standard, for example, limits the availability of designers to use compliant optical transceivers for purposes that would require additional electrical inputs, due to the pin limitation.

Standards such as the SFF standard have limited designers from being able to effectively use built-in test functionality or other health information techniques to gather and report operational data on an optical transceiver. For example, when there are performance problems on an optical network, it is desirable for designers or test engineers to ascertain which component is causing signal loss so that the component may be isolated and replaced without substantial downtime and without substantial replacement costs. Currently, a technician would be required to break the optical network and insert a separate analyzer along different portions of the network to eventually isolate the fault condition and equipment. It is therefore desirable to have self-examining optical transceivers capable of internally detecting faults, for example, faults between two transceivers spaced apart by an optical fiber, and report that diagnostic data back to a microcontroller for analysis.

With optical transceivers limited by space constraints like those of the SFF standard, designers have been unable to devise a technique for effectively communicating diagnostic data from the transceiver as the pins on the transceiver have already been assigned different roles. In essence, there are not enough input/output pins to have the optical transceiver output yet another signal, i.e., a detailed diagnostic or health information.

It is therefore desirable to have a technique for communicating with an optical transceiver to provide diagnostic and/or other transceiver specific data within the current SFF packaging framework.

SUMMARY OF THE INVENTION

An embodiment of the invention is an apparatus for bidirectional communication between an optical transceiver having at least one output pin and a distal processor, the apparatus comprising: a first full-duplex circuit coupled to the optical transceiver for receiving a first signal from the distal processor along a first signal line, the first full-duplex circuit coupled to the optical transceiver for transmitting a second signal on the first signal line to the distal processor; and a second full-duplex circuit coupled to the distal processor for receiving the second signal from the first full-duplex circuit and along a second signal line coupled to the first signal line, the second full-duplex circuit coupled to the distal processor for transmitting the first signal to the optical transceiver on the second signal line.

Another embodiment of the invention is an apparatus for full-duplex communications between a small form factor optical transceiver having a receptacle end for coupling to an optical fiber assembly and a pin connector having a plurality of connector pins for coupling to a distal circuit assembly, the apparatus comprising: an optical transceiver circuit coupled to one of the plurality of connector pins and comprising a signal source for transmitting a transceiver data signal on the one of the plurality of connector pins, the optical transceiver circuit comprising a differentiator for receiving an external data signal from a distal source via the one of the plurality of connector pins and differentiating the received external data signal from the transmitted transceiver data signal.

A further embodiment of the invention is a method of bidirectional full-duplex communication between an optical transceiver having a plurality of connector pins and a distal processor circuit, the method comprising: coupling a first signal source in the optical transceiver to one of the plurality of connector pins for producing a transceiver data signal; coupling a first signal differentiator to the one of the plurality of connector pins for receiving a data signal from the distal processor and differentiating the received data signal from the distal processor circuit from the transmitted data signal; providing a second signal source of the distal processor circuit to the one of the plurality of connector pins for producing the data signal from the distal processor circuit; and providing a second signal differentiator in the distal processor circuit to the one of the plurality of connector pins for receiving the transceiver data signal and differentiating the received transceiver data signal from the data signal transmitted from the distal processor circuit.

Some embodiments provide full-duplex, bidirectional communication for a device on an optical network, such as an optical transceiver device. In some embodiments an external circuit or controller communicates with a network device on a communication link, while simultaneously and preferably on the same communication link that network device communicates back to the external circuit. In this way, a single communication link may be used for both transmitting and receiving data, thus allowing existing network device connections to be used for device communication without adding additional connections. The ability to communicate with a network device in a full-duplex, bidirectional manner may be used in many different applications, at least some of which include self-diagnosis applications, where an external circuit sends instructions to a network device to initiate a self-diagnosis mode, and where that network device subsequently and/or simultaneously transmits the results of its self diagnosis mode over the full-duplex, bidirectional communication link.

The features, functions, and advantages can be achieved independently in various embodiments of the present invention or may be combined in yet other embodiments.

DETAILED DESCRIPTION OF AN EXAMPLE

Various examples are provided for a bidirectional, full-duplex communication between an external circuit and an optical network device. The communications may be over a single communication link, such as a single pin connector on a standardized optical transceiver platform, and those communications may offer simultaneous communication over the link both to and from the optical network device. In some examples described below, such communication is achieved by using identical duplexing circuitry at both the optical transceiver end and the external circuit end. It will be appreciated that such examples are by way of description and not limitation. Modifications, additions, and substitutions may be used by persons of ordinary skill in the art. Furthermore, although detailed examples below are described in the context of achieving communication-with an optical network device, it will be appreciated by persons of ordinary skill in the art that the apparatuses and techniques described herein may be used in other applications and/or with other devices that may benefit from full-duplex, bidirectional communication.

Figure 1:
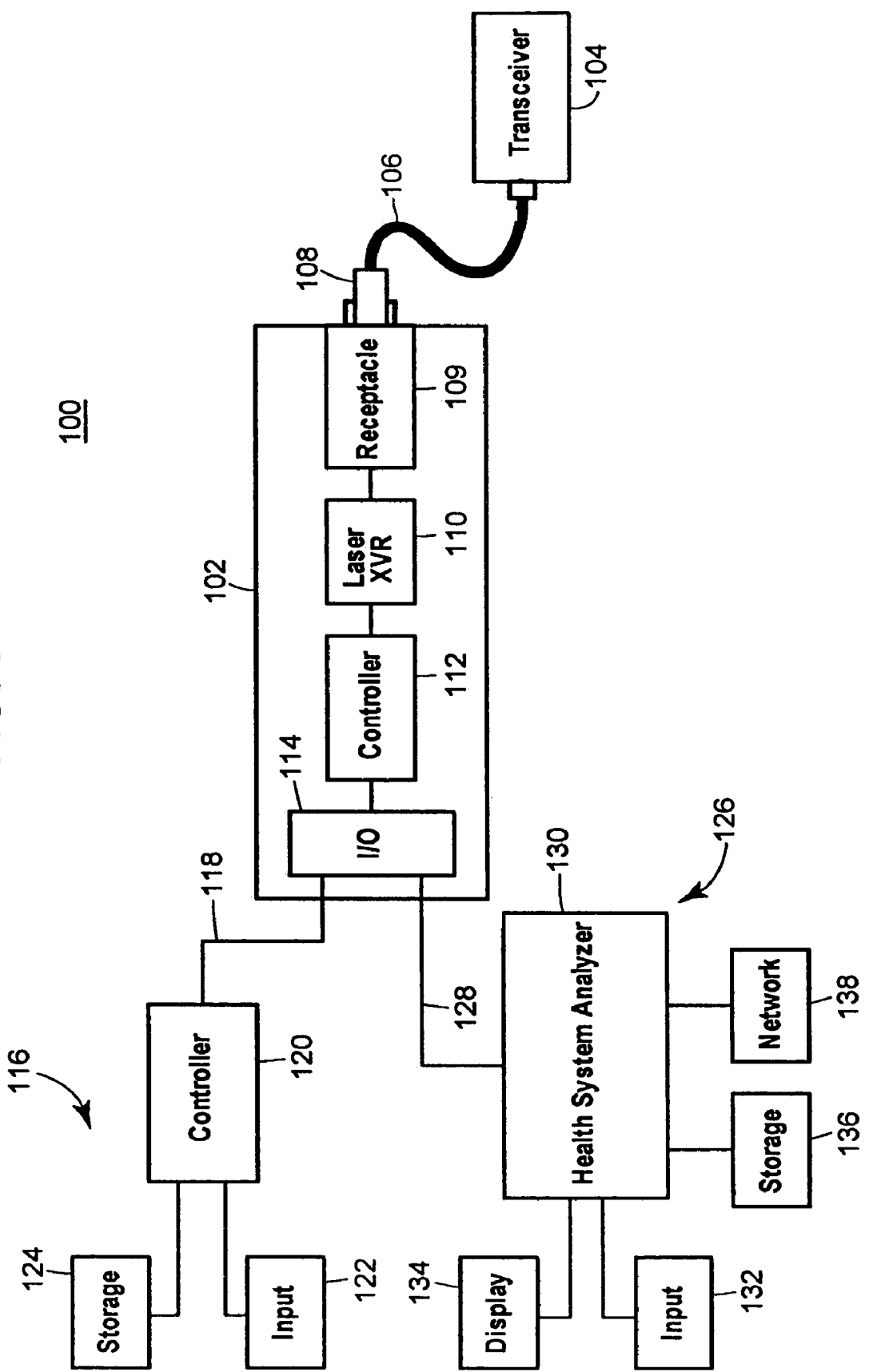
FIG. 1 illustrates an example optical transceiver communication linkage, for example as may be used in an aerospace application.

FIG. 1 illustrates an example optical communication system 100 that includes an optical transceiver 102 coupled for communication with another optical transceiver 104 via a fiber optic link 106. The system 100 generally illustrates any form of optical linking application including, for example, networking applications such as an Ethernet, Gigabit Ethernet, Fibre Channel, ATM, SONET/SDI or FDDI optical network, for example. More generally, the system 100 represents any optical data transmission system, including systems having distributed optical sensors or controllers as may be implemented in fixed infrastructure applications, such as in vehicles like spacecraft or aircraft.

The optical transceiver 102, by way of example, is illustrated with a fiber plug 108 and plug receptacle 109 that may be a standard fiber plug receptacle compliant with SFF package optical transceivers, including transceivers compliant with the Small Form Factor Pluggable (SFP) Transceiver Multisource Agreement (MSA) of Sep. 14, 2000. Example fiber plug connectors include those for single mode or multimode fibers, such as for example ST, SC, MT-RJ, LC, optical pigtails, etc. The receptacle 109 is coupled to a laser/photodiode block 110, in the illustrated example, the block 110 providing both transmitted laser data signals for transmission on the optical fiber 106 as well as photo detection of light data signals received on fiber 106. The laser/photodiode block is controlled by a controller 112 which in the illustrated example is included within the optical transceiver 102. An input/output interface block 114 is coupled to the controller 112 for transmitting and receiving electrical data signals from the optical transceiver 102.

In the illustrated example, the optical transceiver 102 acts as a primary transceiver for communicating with the single remote transceiver 104. For example the optical transceiver 102 may provide control data to the transceiver 104 for operating a remote sensor, controller, or other device coupled thereto (not shown).

In the example illustration of FIG. 1, the optical transceiver 102 is coupled via the input/output block 114 to two different distal processor systems. A control system 116 is coupled to the optical transceiver 102 through signal line 118, which in the illustrated example may provide control data for the network system 100 for operating the optical transceiver 102. Although a single electrical signal line 118 is shown, it will be understood by persons of ordinary skill in the art that the line 118 may represent multiple lines, a bus, or other connection for providing as many signals as needed to the optical transceiver 102. In some examples, interfaces such as GBIC, a PC card, or motherboard may be used to connect directly with the transceiver. The control system 116 includes a controller 120, for example, a microprocessor, coupled to an input device 122, such as a keyboard, keypad, laptop computer or other wired or wireless device for providing user or other instructions to the controller 120. The controller 120 is separately coupled to a storage device 124, in the illustrated example.

A second distal processor system 126 is also coupled to the optical transceiver 102. In the illustrated example, the second distal processor system 126 is an analyzing system which, as discussed in further detail below, may form a bidirectional full-duplex communication link with the optical transceiver 102 via electrical signal line 128. In the illustrated example, the distal processor system 126 is a health analyzer capable of receiving status information from the optical transceiver 102 to an analyzer 130 capable of determining the operational state of the optical transceiver 102 or other information transmitted on line 128. The analyzer 130, for example, may assess when the optical transceiver 102 is failing to transmit or receive data. Alternatively, and also by way of example, the analyzer 130 may determine environmental operating conditions for the optical transceiver such as operating temperature. Other health or diagnostic information includes transmitter output power, received signal amplitude, time domain cable plant loss, supply voltage, supply current, and optical time domain reflectometry signals, by way of example. Though separate in the illustrated example, it will be appreciated that the distal systems 116 and 126 may be combined into a single interfacing system. The transceiver 102 may be a self-examining optical device capable of detecting faults or other poor operating conditions and communicating such information to a distal processor. In other examples, built-in test functions within the transceiver may used to detect health or diagnostic information and analyze that information prior to sending to a distal processor. As with the example information outlined above, the detection and analysis may include transceiver specific characteristics or network characteristics, for example the performance of other network devices or faulting networking fiber as determined using optical time domain reflectometry or other assessment techniques. It will be appreciated that the illustrated examples may be used in any applicable optical transceiver, transmitter, or receiver application. In some examples, the system 100 may be used in aircraft or spacecraft employing optical transceivers. In some examples, the distal processor system 126 may be stored locally on the aircraft of spacecraft or the system 126 may be stored remote from the same and in communication to receive transceiver data through a wireless RF link.

In the illustrated example, the analyzer 130 is coupled to an input device 132, a display 134, data storage 136, and network interface 138 for communicating health information to a remote user or system or processor. It will be appreciated by persons of ordinary skill in the art that the network interface 138 may be a wire or wireless network interface, for example.

Figure 2:
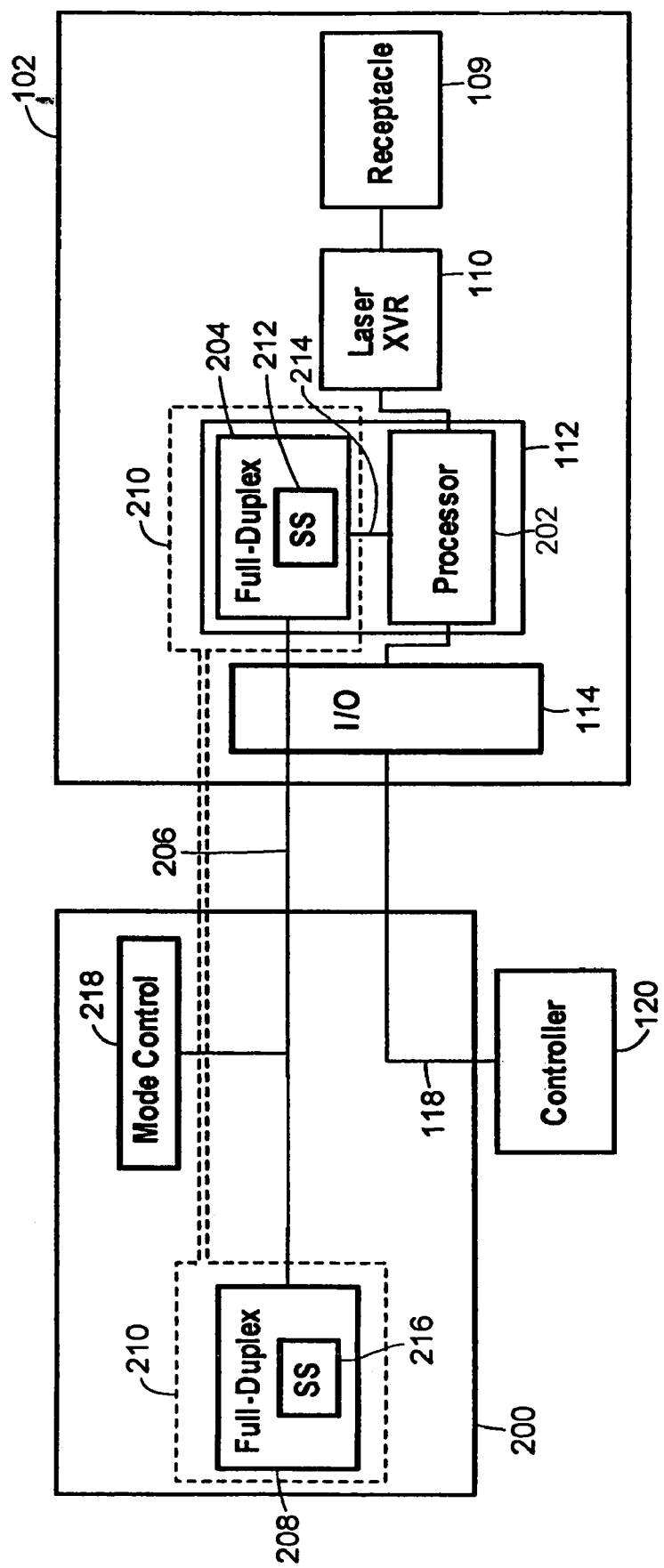
FIG. 2 illustrates a block diagram of an implementation of an optical transceiver linkage having a bidirectional, full-duplexing control for communication with each optical transceiver.

In an example, to achieve bidirectional full-duplex communication between an optical transceiver and a distal processor system, FIG. 2 illustrates a more detailed example of the optical transceiver 102 in communication with an example distal processor system 200, which may form all or part of the distal processor system 116 or 126 or be considered a separate system altogether. In the example of FIG. 2, the controller 112 is illustrated as having a processor 202 and a separate circuit 204 that operates as a full-duplexing circuit for the transceiver 102. Although the controller 112 is illustrated as being formed of two different circuit blocks, in this illustration, it will be appreciated by persons of ordinary skill in the art that the controller 112 may be implemented in other ways including via a single circuit such as a microprocessor circuit, application specific integrated circuit (ASIC), or the like.

The full-duplex circuit 204 of the optical transceiver is coupled to the input/output block 114 and on a single electrical line 206 that is, in the illustrated example, directly coupled to a matching full-duplex circuit 208 in the distal processor system 200. By having this linking between the two full-duplexing circuits 204 and 208, the distal system 200 and in the optical transceiver 102 may be made to have full-duplex bidirectional communication on the single line 206. This may allow the distal processor system 200 and the optical transceiver 102 to simultaneously communicate with one another without interruption of data transmission through the device. For description purposes, FIG. 2 illustrates a bidirectional communication path as a bidirectional circuit 210. By having a full-duplexing communication link, the system 200 may transmit data on the signal line 206 instructing the optical transceiver 102 to initiate a health mode, a diagnostic mode, or other built-in test mode and have the optical transceiver 102 communicate diagnostic or health data back to the system 200 also along the signal line 206, without interrupting normal control and operation of the optical transceiver. With respect to the illustrated example, the optical transceiver 102 may still receive its control signals from controller 120 along line 118 and such received and transmitted information would not be interrupted by the single line full-duplexing communications back and forth between the optical transceiver 102 and the system 200. To communicate data from the system 200 to the optical transceiver 102, the full-duplexing circuit 208 includes a signal source 212, which may be a processor-controlled voltage source. The signal source 212 may be modulated to provide digital instruction data (ones and zeros) to the full-duplexing circuit 208. Correspondingly, the circuit 208 includes a signal source 216 that may transmit data to the circuit 204 which then provides that data via an electrical signal differentiator to an output 214 coupled to the microprocessor 202. That is, the full-duplexing circuit 204 may receive the digital information from the signal source 216 differentiate that received signal from its transceiver data signal transmitted of the signal source 212. Going the other way, the microprocessor 202 may take the output signal 214 containing instruction data from the distal source 200 and analyze that instruction data for determining operation of the optical transceiver 102. The optical transceiver 102 may for example receive instructions to provide diagnostic or health information via the signal source 212 through the full-duplexing circuit 204 on line 206.

The example of FIG. 2 also illustrates the distal processor system 200 including a mode control signal 218 coupled to line 206 for controlling the duplexing mode of the bidirectional circuit 210. For example in a first state of the mode control signaler 218, full-duplexing, bidirectional communication between the distal system 200 and the optical transceiver 102 would be disabled while in a second state such communication would be enabled.

Figure 3:
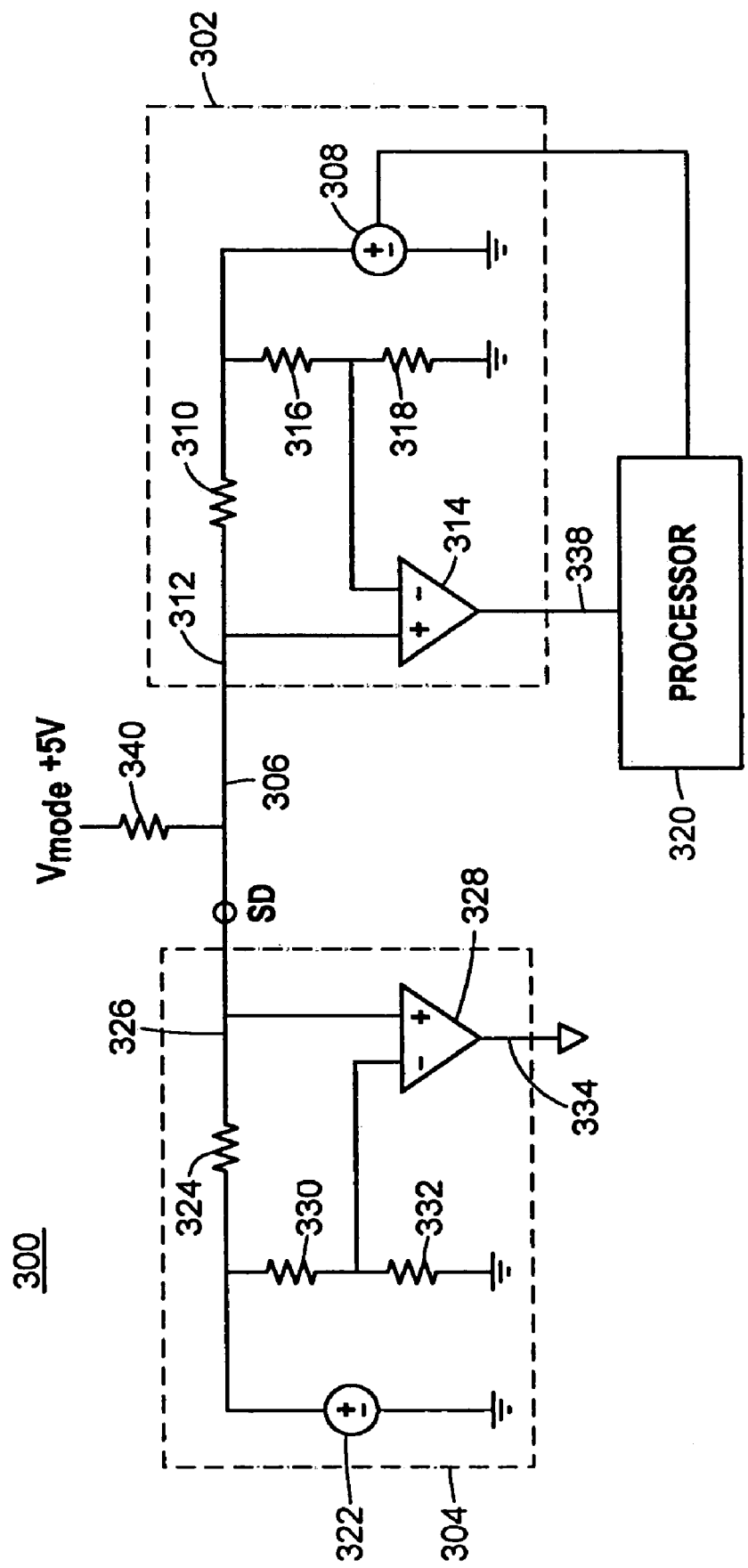
FIG. 3 illustrates an example circuit diagram for a bidirectional full-duplexing circuit that may be used with the optical transceiver of FIG. 2.

FIG. 3 illustrates an example implementation 300 of a bidirectional full-duplexing circuit, in which a first duplexing circuit 302 is coupled to a second duplexing circuit 304 via a signal line 306. The first full-duplexing circuit includes a controllable voltage source 308 coupled to a resistor 310 and a first signal line 312, which becomes line 306. The full-duplexing circuit 302 includes a difference amplifier 314 having a noninverted input coupled directly to a node of the resistor 310 and an inverted input coupled to a node shared by resistors 316 and 318. In the illustrated example, the resistors 310, 316 and 318 form a voltage divider network that couples the voltage source 308 to the difference amplifier 314 and helps facilitate the difference amplifier 314 being able to effectively ignore the output signal from the voltage source 308 on line 306 and only change output states in response to a data signal received from the distal duplexing circuit 304. The output from the difference amplifier 314 may be coupled to a processor 320 for controlling the voltage source 308.

To achieve full-duplexing bidirectional communications with the circuit 302, and by way of example, the circuit 304 is substantially the same as the circuit 302. A voltage source 322 is coupled to a resistor 324 that provides an output signal on a signal line 326 that becomes signal line 306. The resistor 324 also has a node coupled to the noninverting input of a difference amplifier 328. The inverting input of the difference amplifier 328 is coupled to a node shared by resistor 330 and another resistor 332, where resistors 324, 330 and 332 form a voltage divider network.

Full-duplex communication may be achieved by setting the resistor values of the two circuits 302 and 304 such that the effect of each respective voltage source or signal source for a particular circuit is minimized at that circuit's difference amplifier so that the difference amplifier is responsive only or primarily to the signal source of the other circuit. For example, if the voltage source 322 of circuit 304 produces an output voltage $V_A$ during a high cycle of digital data transmission, the resistor values for resistors 324, 330 and 332 may be chosen such that each of the noninverting and inverting inputs to the difference amplifier 328 receive approximately $V_A/2$ at each input, such that an output signal 334 from the difference amplifier 328 is unaffected by the particular value $V_A$ of the voltage source 322. Similarly the resistor values for resistors 310, 316 and 318 may be chosen such that a voltage value $V_B$ of voltage source 308 appears as $V_B/2$ at each of the inverting and noninverting inputs to the difference amplifier 314, so that an output signal 338 provided to the processor 320 is substantially unaffected by the particular value of $V_B$ on the circuit 302. For example, in a digital signaling context, the output signal is sufficiently independent of a local data signal source, that the output signal may be analyzed for data signals of an external source without incurring unacceptable bit error rates in that analysis.

Example values for the various resistors are provided in table 1 below. The table also includes a value for a balancing resistor 338 coupled in the illustrated example to a high voltage source of +5 volts.

EXAMPLE 1

| Resistor Element | Resistance Value (Ohms) |
|---|---|
| 310 | 1K |
| 316 | 1M |
| 318 | 910K |
| 324 | 1K |
| 330 | 1M |
| 332 | 910K |
| 338 | 10K |

Looking at a sample calculation based on the example numbers provided above and computing based on a voltage at a node SD, the following calculations provide an example of the responsiveness of each of the outputs 334 and 338 of the respective difference amplifier circuits for duplexing surface 304 and 302, respectively. By superposition, the signal at SD is:

$$V_{SD} = \frac{R_{310}||R_{338}}{R_{324}+R_{310}||R_{338}}V_{322} + \frac{R_{324}||R_{310}}{R_{338}+R_{324}||R_{310}}V_{mode} + \frac{R_{324}||R_{338}}{R_{310}+R_{324}||R_{338}}V_{308}$$

For the values given in the table, $V_{sd} = 0.476 V_{322} + 0.238 + 0.476 V_{308}$.

Now, the inverting input at the left side for difference amplifier 328 has a value of $V_{328\ (inverting\ input)} = 0.476 V_{322}$, and on the right side for difference amplifier 314 has an inverting input value of $V_{314\ (inverting\ input)} = 0.476 V_{308}$.

So the output voltage of the amplifier 328 is $V_{334} = V_{SD} - V_{328\ (inverted\ input)} = 0.238 + 0.476 V_{308}$ and the output voltage of amplifier 314 is $V_{338} = V_{SD} - V_{314\ (inverted\ input)} = 0.238 + 0.476 V_{322}$. That is in both examples the corresponding output voltage from the difference amplifier is independent of the voltage source for that difference amplifier's circuit.

The duplexing mode of the circuit 300, in the example illustrated in FIG. 3, is controlled by a pull-up voltage (e.g., +5 volts) across the resistor 340. As described herein, the circuit 304 may be part of a distal processor, such as the distal processor 200 illustrated in FIG. 2, that is able to determine whether that distal system is to communicate with an optical transceiver via a full-duplex bidirectional communication on a single transmission line or not, by detecting whether there is a pull-up voltage on that line (for example, line 306), upon startup of the distal system and prior to receiving any data signals from the optical transceiver. For example, if the circuit 304 is part of a distal system that has yet to provide instruction data to turn on a health system or self diagnostic test of an optical transceiver, then the distal system could determine whether to request such information and engage in a full-duplex link with an optical transceiver by first determining if there is a pull-up voltage on the line. In this way, the pull-up voltage acts as a mode control signal source.

The full-duplexing illustrated in FIG. 3 is provided by way of example. It will be appreciated that other implementations may be used, including other circuit configurations or other circuits such as a microprocessor, ASIC, or transformer circuit.

Figure 4:
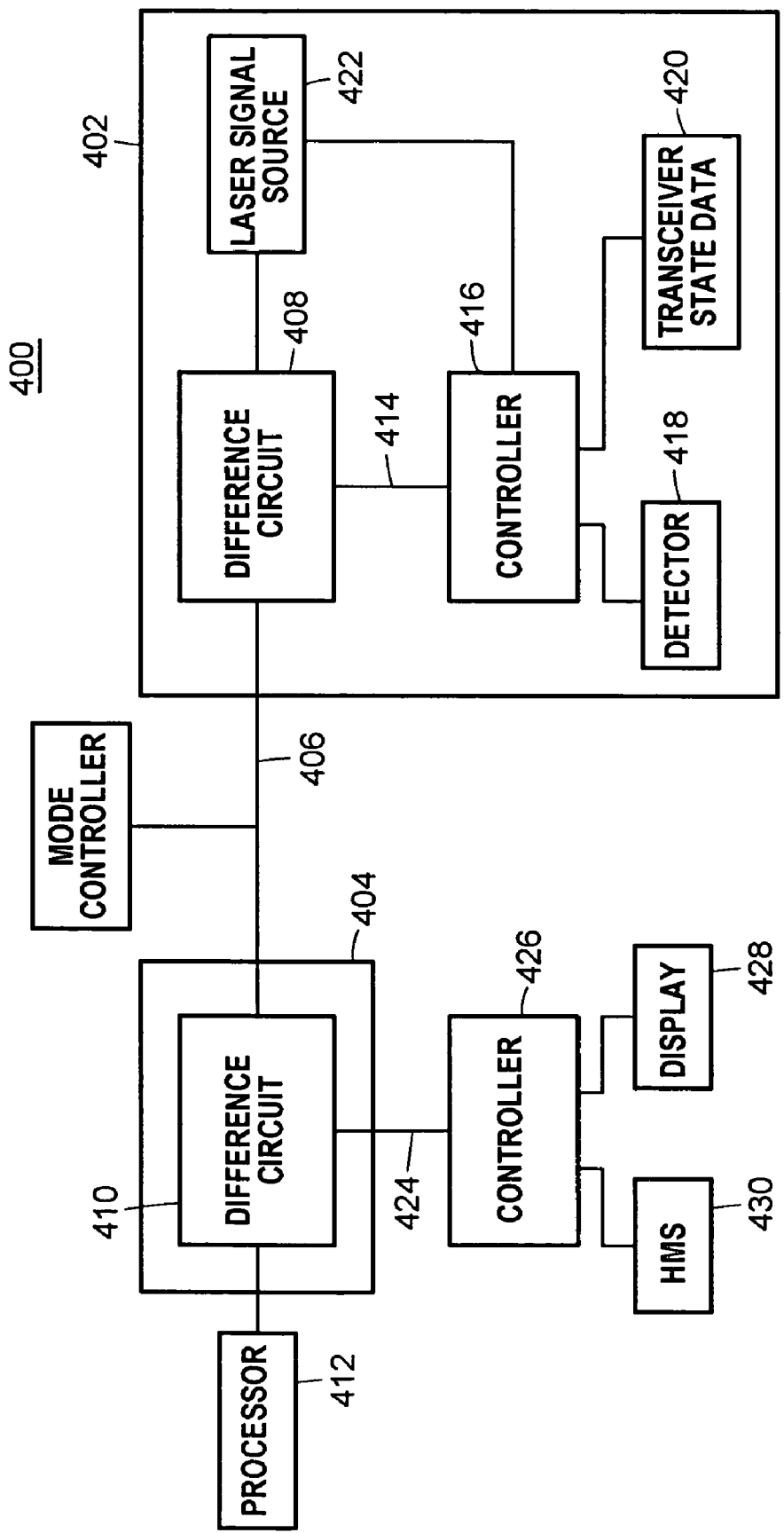
FIG. 4 illustrates an example implementation of a bidirectional, full-duplexing optical transceiver communication system where digital information is transmitted by and received to an optical transceiver.

FIG. 4 illustrates an example health management system 400 that uses a full-duplex bidirectional communication between an optical transceiver 402 (partially shown) and a distal processor 404, where that communication is in the illustrated example achieved along a single transmission line 406. The system 400 may be used as a self-examining system capable of examining and communicating system performance. Each of the circuits 402 and 404 in the illustrated example include difference circuits 408 and 410 respectively, which may be full-duplexing circuits such as those described herein. In the illustrated example, the digital data signal to be communicated from the element 404 is provided by an external signal source or processor 412 to the difference circuit 410 for providing instruction data to the element 402. The element 402 provides a difference output proportional to this instructional data on an output 414 to a controller 416 of the optical transceiver. Upon receiving data to begin a health assessment or a self diagnosis, the controller 416, for example, may activate a detector 418 to measure an operating condition of the device, for example, temperature, output power, or received signal power. The controller 416 may separately or additionally activate a transceiver state data device 420 that, for example, may be capable of determining one or more of the health or diagnostic information listed above or other performance metric. Although the transceiver 402 is only partially shown, it will be understand that these built-in test or self-examining features of the transceiver 402 may be operated simultaneously with normal transceiver data transmission and reception of a laser transceiver stage coupled to an optical fiber (not shown), such as shown in the example of FIG. 1. Thus, bidirectional, full-duplexing communication of built-in test operations may be achieved even during normal transceiver operation.

The transceiver-specific data from either of the two devices 418 or 420 may be provided back to the controller 416 for transmission from a controller-modulated signal source 422, also coupled to the difference circuit 408. By having a full-duplexing bidirectional functionality, the output 414 would be proportional to the data signal received from element 404 on line 406 but would be substantially independent of the signal transmitted by the signal source 422 also on signal line 406. The transceiver data from the signal source 422 would be received by the difference circuit 410 and communicated via output line 424 to a separate controller 426 in the illustrated example. The controller 426 may then pass along the transceiver data, indicative of health or diagnostic information of the optical transceiver, to a display 428 or remote health management system 430 for storage, further diagnosis, or other processing. As part of an optical transceiver control system (not shown), the controller 426 may be coupled such that instructions are provided back to the device 402, in response to the assessment of the health or diagnostic information to adjust the transceiver performance.

The full-duplexing bidirectional communication examples provided herein may be used in a variety of applications and are not limited to the examples described herein above. One advantageous application is with respect to small form factor (SFF)—compliant optical transceivers where due to industry standards each optical transceiver includes a predetermined, specified number of output pins to allow for standardized plugability of compliant transceivers. Because SFF standards restrict the number of connector pins for an optical transceiver, and because those standards assign each pin a specified function for either transmitting or receiving data to or from the optical transceiver, it was believed that such optical transceivers could not be easily augmented with additional functionality, such as adding health information or a self-diagnostic features, while still maintaining SFF compliance. With the full-duplexing bidirectional techniques described herein, however, a single connector pin of a SFF optical transceiver may be used for full-duplex bidirectional communication of both instructional data and health or self diagnostic data, and on a single line.

Figure 5:
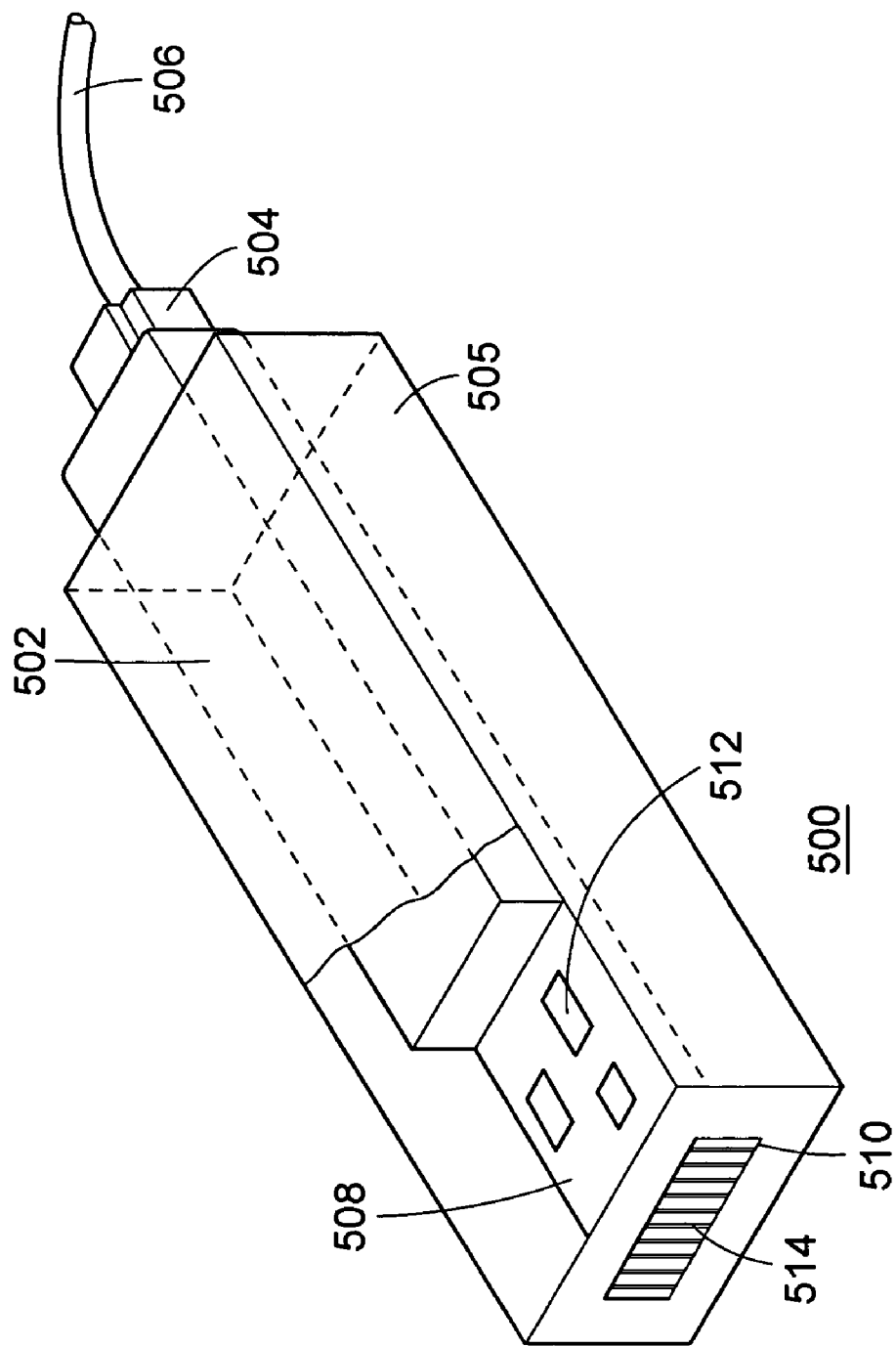
FIG. 5 illustrates an example optical transceiver having a pin that is used to achieve full-duplex, bidirectional communication.

FIG. 5 illustrates an optical transceiver assembly 500 compliant with the SFF standard. The optical transceiver assembly 500 includes a receptacle end 502 for receiving a plug 504 of an optical fiber 506, that receptacle 502 being housed within a housing 505 and operatively coupled to a control board, e.g., a printed circuit board 508, that is coupled to a connector end 510. In the illustrated example, the connector end 510 includes the ten (10) identified connector pins for a SFF optical transceiver, with pin assignments as listed in the table below. Persons of ordinary skill in the art will recognize that these pin assignments are by way of example, and that in other SFF compliant transceivers 20 pin designations may be used. It is also noted that the pin assignments may be different, in type, for different datacom applications.

| Pin # | Description |
| --- | --- |
| Pin 1 | Receiver signal ground |
| Pin 2 | Receiver power supply |
| Pin 3 | Signal detect |
| Pin 4 | Received data out low |
| Pin 5 | Received data out high |
| Pin 6 | Transmitter power supply |
| Pin 7 | Transmitter signal ground |
| Pin 8 | Transmitter disable |
| Pin 9 | Transmitter data in high |
| Pin 10 | Transmitter data in low |

With illustrated example, the circuit 508 includes a full-duplexing circuit block 512 coupled to the signal detect pin 514 of the connector pin assembly 510. The Signal detect pin 514 which is supposed to be higher active when optical energy above a threshold is absorbed by the transceiver detector, is rarely used due in part to a large threshold variation at which the signal detect signal is asserted. Therefore, full-duplex bidirectional communication can be achieved using this single connector pin output by disabling the Signal Detect feature and connecting the full-duplexing 512 to the connector pin 514 and then the connector pin 514 to a distal processor system having a full-duplexing circuit such as those described herein. For health information and self diagnostic systems disabling the Signal Detect pin should not present reduced functionality as there should be no need for the signal since the lack of sufficient optical power ordinarily detected by the signal detect pin line could easily be determined through health measurements of the optical transceiver itself using the full-duplex bidirectional functionality. The use of a Signal Detect pin is an example. In other applications other pins may be used, such as fault pins or others.

Although certain apparatus constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. An apparatus for bidirectional communication between an optical transceiver having at least one output pin and a distal processor, the apparatus comprising: a first full-duplex circuit coupled to the optical transceiver for receiving a first signal from the distal processor along a first signal line, the first full-duplex circuit coupled to the optical transceiver for transmitting a second signal on the first signal line to the distal processor; and a second full-duplex circuit coupled to the distal processor for receiving the second signal from the first full-duplex circuit and along a second signal line coupled to the first signal line, the second full-duplex circuit coupled to the distal processor for transmitting the first signal to the optical transceiver on the second signal line, wherein the first full-duplex circuit comprises: a voltage source coupled to the first signal line and for producing the second signal; and a difference amplifier coupled to the voltage source and to the first signal line, for providing a difference output signal responsive to the first signal received on the first signal line.

2. The apparatus of claim 1, wherein the difference amplifier is coupled such that the difference output signal is substantially independent of the second signal from the voltage source.

3. The apparatus of claim 1, further comprising a voltage divider network coupling the voltage source to both inverting and non-inverting inputs of the difference amplifier.

4. The apparatus of claim 3, wherein the voltage divider network comprises a first voltage divider coupling the voltage source to the non-inverting input and resistor element coupled between the voltage source and the inverting input and the first signal line.

5. The apparatus of claim 4, wherein the second full-duplex circuit is the same as the first full-duplex circuit.

6. The apparatus of claim 1 wherein the first full-duplex circuit comprises an electrical signal differentiator coupled to the first signal line and capable of differentiating between the second signal transmitted on the first signal line and the first signal received on the first signal line, the electrical signal differentiator for producing an output signal proportional to the first signal and substantially independent of the second signal.

7. The apparatus of claim 6 wherein the second full-duplex circuit comprises an electrical signal differentiator coupled to the second signal line and capable of differentiating between the first signal transmitted on the second signal line and the second signal received on the second signal line, the electrical signal differentiator for producing an output signal proportional to the second signal and substantially independent of the first signal.

8. The apparatus of claim 6, wherein the optical transceiver comprises a packaged assembly having a receptacle end for receiving an optical fiber assembly and a connector end comprising at least one output pin for coupling to the distal processor, wherein the first full-duplex circuit is formed within the optical transceiver such that the first signal line is coupled to the at least one output pin.

9. The apparatus of claim 8, wherein the optical transceiver is a small form factor optical transceiver.

10. The apparatus of claim 6, further comprising a processor coupled to first full-duplex circuit to receive the output signal from the electrical signal differentiator of the first full-duplex circuit and to control the value of the first signal.

11. The apparatus of claim 6, wherein the electrical signal differentiator comprises a difference amplifier circuit.

12. An apparatus for full-duplex communications between a small form factor optical transceiver having a receptacle end for coupling to an optical fiber assembly and a pin connector having a plurality of connector pins for coupling to a distal circuit assembly, the apparatus comprising: an optical transceiver circuit coupled to one of the plurality of connector pins and comprising a signal source for transmitting a transceiver data signal on the one of the plurality of connector pins, the optical transceiver circuit comprising a differentiator for receiving an external data signal from a distal source via the one of the plurality of connector pins and differentiating the received external data signal from the transmitted transceiver data signal.

13. The apparatus of claim 12, wherein the differentiator comprises a difference amplifier coupled to the signal source and the one of the plurality of connector pins.

14. The apparatus of claim 12, wherein the one the plurality of connector pins is a connector pin of a small form factor compliant device.

15. A method of bidirectional full-duplex communication between an optical transceiver having a plurality of connector pins and a distal processor circuit, the method comprising: coupling a first signal source in the optical transceiver to one of the plurality of connector pins for producing a transceiver data signal; coupling a first signal differentiator to the one of the plurality of connector pins for receiving a data signal from the distal processor and differentiating the received data signal from the distal processor circuit from the transmitted data signal; providing a second signal source of the distal processor circuit to the one of the plurality of connector pins for producing the data signal from the distal processor circuit; and providing a second signal differentiator in the distal processor circuit to the one of the plurality of connector pins for receiving the transceiver data signal and differentiating the received transceiver data signal from the data signal transmitted from the distal processor circuit.

16. The method of claim 15 further comprising coupling a duplex mode control signal to the one of the plurality of connector pins for identifying a duplexing mode when the duplex mode control signal is in a first state, and a non-duplexing mode when the duplex mode control signal is in a second state.

17. The method of claim 15, wherein the first signal differentiator comprises a difference amplifier and a voltage divider coupling the first signal source to at least one of the inputs of the difference amplifier.

18. The method of claim 15, wherein the optical transceiver is a small form factor optical transceiver and wherein the one of the plurality of connector pins is one of the predetermined connector pins defined for small form factor optical transceivers.

19. The method of claim 15 further comprising communicating the transceiver data signal and the data signal from the distal processor circuit simultaneously over the one of the plurality of connector pins, the data signal from the processor circuit providing instructional data and the transceiver data signal providing health or diagnostic data.

20. An apparatus for bidirectional communication between an optical transceiver having at least one output pin and a distal processor, the apparatus comprising: a first full-duplex circuit coupled to the optical transceiver for receiving a first signal from the distal processor along a first signal line, the first full-duplex circuit coupled to the optical transceiver for transmitting a second signal on the first signal line to the distal processor; and a second full-duplex circuit coupled to the distal processor for receiving the second signal from the first full-duplex circuit and along a second signal line coupled to the first signal line, the second full-duplex circuit coupled to the distal processor for transmitting the first signal to the optical transceiver on the second signal line, wherein the first full-duplex circuit comprises an electrical signal differentiator coupled to the first signal line and capable of differentiating between the second signal transmitted on the first signal line and the first signal received on the first signal line, the electrical signal differentiator for producing an output signal proportional to the first signal and substantially independent of the second signal, and wherein the first full-duplex circuit comprises: a voltage source coupled to the first signal line and for producing the second signal; and a difference amplifier coupled to the voltage source and to the first signal line, for providing a difference output signal responsive to the first signal received on the first signal line.

21. The apparatus of claim 20, wherein the difference amplifier is coupled such that the difference output signal is substantially independent of the second signal from the voltage source.

22. The apparatus of claim 20, further comprising a voltage divider network coupling the voltage source to both inverting and non-inverting inputs of the difference amplifier.

23. The apparatus of claim 22, wherein the voltage divider network comprises a first voltage divider coupling the voltage source to the non-inverting input and resistor element coupled between the voltage source and the inverting input and the first signal line.

24. The apparatus of claim 23, wherein the second full-duplex circuit is the same as the first full-duplex circuit.

25. The apparatus of claim 20 wherein the second full-duplex circuit comprises an electrical signal differentiator coupled to the second signal line and capable of differentiating between the first signal transmitted on the second signal line and the second signal received on the second signal line, the electrical signal differentiator for producing an output signal proportional to the second signal and substantially independent of the first signal.

26. The apparatus of claim 20, wherein the optical transceiver comprises a packaged assembly having a receptacle end for receiving an optical fiber assembly and a connector end comprising at least one output pin for coupling to the distal processor, wherein the first full-duplex circuit is formed within the optical transceiver such that the first signal line is coupled to the at least one output pin.

27. The apparatus of claim 26, wherein the optical transceiver is a small form factor optical transceiver.

28. The apparatus of claim 20, further comprising a processor coupled to first full-duplex circuit to receive the output signal from the electrical signal differentiator of the first full-duplex circuit and to control the value of the first signal.

29. The apparatus of claim 20, wherein the electrical signal differentiator comprises a difference amplifier circuit.

30. An apparatus for bidirectional communication between an optical transceiver having at least one output pin and a distal processor, the apparatus comprising: a first full-duplex circuit coupled to the optical transceiver for receiving a first signal from the distal processor along a first signal line, the first full-duplex circuit coupled to the optical transceiver for transmitting a second signal on the first signal line to the distal processor; and a second full-duplex circuit coupled to the distal processor for receiving the second signal from the first full-duplex circuit and along a second signal line coupled to the first signal line, the second full-duplex circuit coupled to the distal processor for transmitting the first signal to the optical transceiver on the second signal line, wherein the first full-duplex circuit comprises an electrical signal differentiator coupled to the first signal line and capable of differentiating between the second signal transmitted on the first signal line and the first signal received on the first signal line, the electrical signal differentiator for producing an output signal proportional to the first signal and substantially independent of the second signal, and wherein the second full-duplex circuit comprises an electrical signal differentiator coupled to the second signal line and capable of differentiating between the first signal transmitted on the second signal line and the second signal received on the second signal line, the electrical signal differentiator for producing an output signal proportional to the second signal and substantially independent of the first signal.

31. The apparatus of claim 30, wherein the first full-duplex circuit comprises: a voltage source coupled to the first signal line and for producing the second signal; and a difference amplifier coupled to the voltage source and to the first signal line, for providing a difference output signal responsive to the first signal received on the first signal line.

32. The apparatus of claim 31, wherein the difference amplifier is coupled such that the difference output signal is substantially independent of the second signal from the voltage source.

33. The apparatus of claim 31, further comprising a voltage divider network coupling the voltage source to both inverting and non-inverting inputs of the difference amplifier.

34. The apparatus of claim 33, wherein the voltage divider network comprises a first voltage divider coupling the voltage source to the non-inverting input and resistor element coupled between the voltage source and the inverting input and the first signal line.

35. The apparatus of claim 34, wherein the second full-duplex circuit is the same as the first full-duplex circuit.

36. The apparatus of claim 30, wherein the optical transceiver comprises a packaged assembly having a receptacle end for receiving an optical fiber assembly and a connector end comprising at least one output pin for coupling to the distal processor, wherein the first full-duplex circuit is formed within the optical transceiver such that the first signal line is coupled to the at least one output pin.

37. The apparatus of claim 36, wherein the optical transceiver is a small form factor optical transceiver.

38. The apparatus of claim 30, further comprising a processor coupled to first full-duplex circuit to receive the output signal from the electrical signal differentiator of the first full-duplex circuit and to control the value of the first signal.

39. The apparatus of claim 30, wherein the electrical signal differentiator comprises a difference amplifier circuit.

* * * * *